Nov. 14, 1950 — W. C. NABORS — 2,530,311
LOWER FIFTH WHEEL
Filed Feb. 7, 1949 — 2 Sheets-Sheet 1

Inventor
William C. Nabors.
By
E. V. Hardaway
ATTORNEY.

Nov. 14, 1950  W. C. NABORS  2,530,311
LOWER FIFTH WHEEL
Filed Feb. 7, 1949  2 Sheets-Sheet 2

Inventor
William C. Nabors.
By E. V. Hardway.
ATTORNEY.

Patented Nov. 14, 1950

2,530,311

UNITED STATES PATENT OFFICE 2,530,311

LOWER FIFTH WHEEL

William C. Nabors, Mansfield, La.

Application February 7, 1949, Serial No. 75,053

5 Claims. (Cl. 280—33.05)

This invention relates to a lower fifth wheel.

The invention hereinafter described includes certain improvements over that type of fifth wheel disclosed in United States Patent No. 2,429,483 issued to me on the 21st day of October, 1947.

An object of the invention is to provide novel means in the lower fifth wheel construction for engaging the king pin of the upper fifth wheel carried by the tractor and whereby the king pin can be more easily released than by the use of the construction disclosed in said patent.

The present invention also embodies novel means for more securely locking the king pin-engaging jaws in active, or engaging position.

It is a further object of the invention to provide simpler, and more efficient, means for manually releasing the jaws, and swinging them to open, or king pin receiving position than is present in the construction disclosed by said patent.

Other objects and advantages will be apparent from the following specification which is illustrated by the accompanying drawings, wherein—

Figure 2:
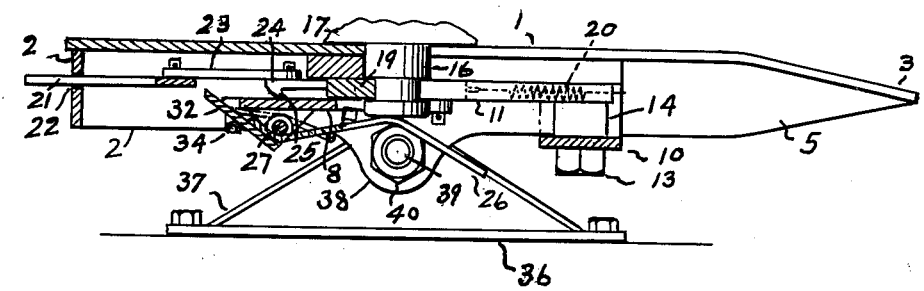
Figure 2 is a sectional view taken on the line 2—2 of Figure 1.

Referring now more particularly to the drawings wherein like numerals of reference designate the same parts in each of the figures, the numeral 1 designates the lower fifth wheel plate which is reinforced by a substantially U-shaped depending flange 2 which may be welded thereto and which depends from the margin thereof all the way around from the front to the rear.

The forward portion of the plate has the forward extensions 3, 3 with the deep king pin receiving slot 4 which diverges forwardly and the inner margins of the extensions 3 have the depending marginal flanges 5, 5 welded thereto.

The forward ends of the flanges 2 and 5 taper forwardly to an apex and the forward ends of the extensions 3 decline forwardly as more clearly shown in Figure 2.

Secured to the inner side of the plate 1 on opposite sides are the outwardly curved brackets 6, 6 which are spaced apart and are of similar shape and which are spaced inwardly from the side margins of the lower fifth wheel. Extending from end to end of these brackets 6 and secured to the plate 1 are the parallel bars 7, 7.

Securely fastened to the rear ends of these bars 7, underneath there is a cover plate 8 whose forward margin is located just to the rear of the slot 4. The forward margin of the plate 8 has a central rectangular notch 9 with the forward directed fingers 9a, 9a, on opposite sides of said notch and whose inner margins are parallel.

Located between the forward ends of the brackets 6 there is a U-shaped plate 10 whose overturned ends may be secured in any approved manner to the fifth wheel structure.

Figure 4:
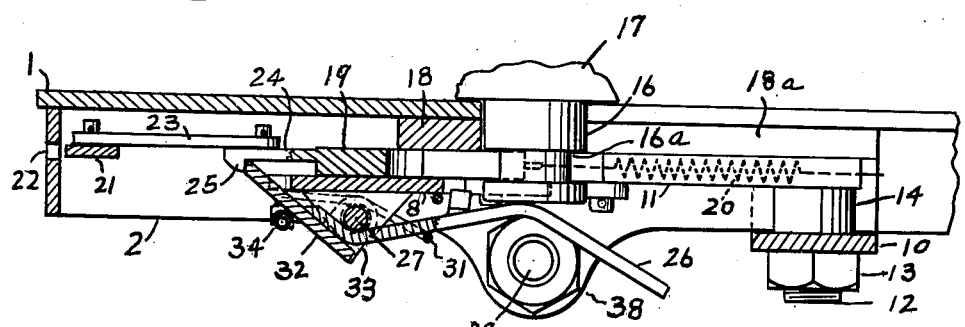
Figure 4 is a fragmentary, sectional view taken on the line 4—4 of Figure 3.

The numerals 11, 11 designate king pin-engaging jaws which are arm like in shape and whose forward ends are pivoted on the studs 12, 12. These studs may be secured to the fifth wheel structure in any preferred manner as by welding. They extend downwardly through the plate 10 and their lower ends are threaded to receive the nuts 13. The jaws 11 are maintained spaced from the plate 10 by means of spacers 14 which surround said studs and are located between the jaws 11 and the plate 10, as shown in Figure 4.

Figure 3:
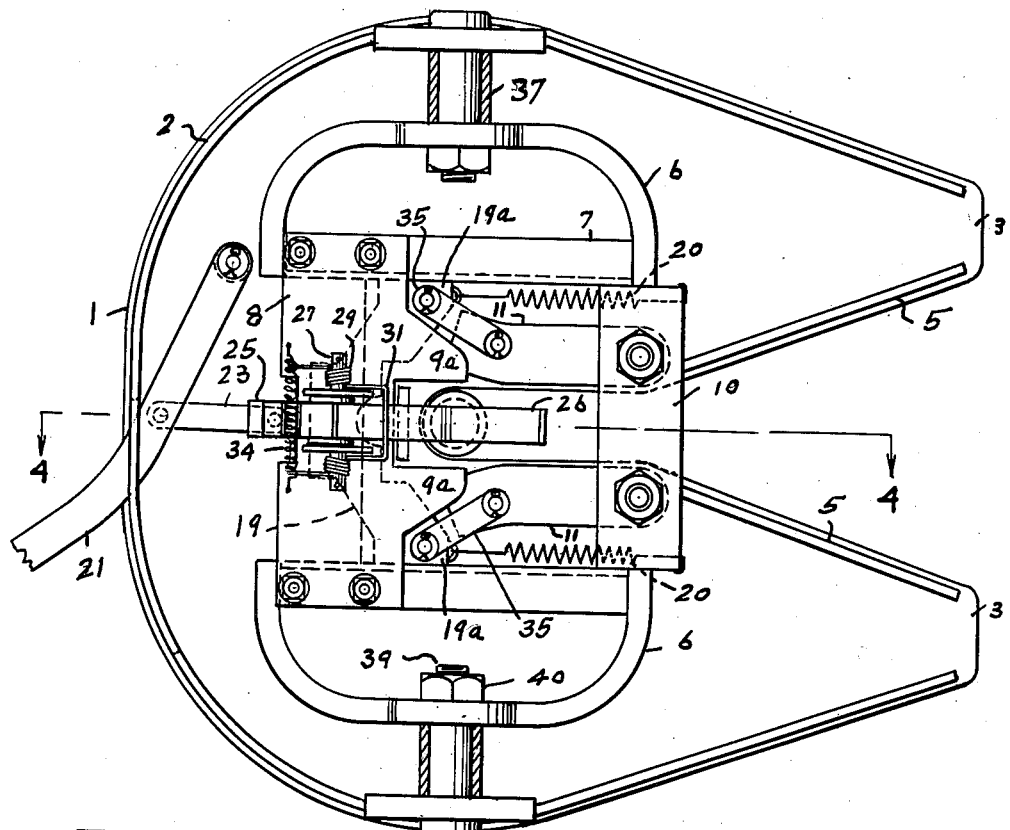
Figure 3 is a bottom plan view of the lower fifth wheel showing said jaws in released position.

The rear ends of the jaws 11 have opposed arcuate recesses 15, which register when the jaws are in closed position to form an arcuate bearing to receive the king pin 16 carried by the upper fifth wheel 17 of the tractor, as more clearly shown in Figure 3, and this king pin has an annular groove 16a therearound in which the jaws 11 fit when the jaws are in closed, or active, position to couple the tractor to the trailer.

From the foregoing it will be apparent that the stress exerted by the king pin against the jaws 11 will be substantially longitudinally of the jaws and there will be substantially no strain tending to force the jaws apart to cause uncoupling of the tractor from the trailer.

The central portion of the plate 1 is reinforced by means of a rectangular block 18, extending transversely of said block and fitted between the bars 7 and which has a slot 18a extending rearwardly from the forward margin thereof and coinciding with the king pin receiving slot 4 of plate 1.

Slidably mounted between the block 18 and the cover plate 8 there is a jaw yoke plate 19 which has the forwardly diverging arms 19a, 19a arranged to embrace the rear ends of the jaws 11 and this yoke plate 19 has a central arcuate recess to fit snugly around the forward side of the king pin and on opposite sides of said recess is provided with the rearwardly directed notches, as 19b, 19b, to snugly receive the outer corners of the forward ends of the jaws 11 so as to hold said jaws securely in active position.

Figure 1:
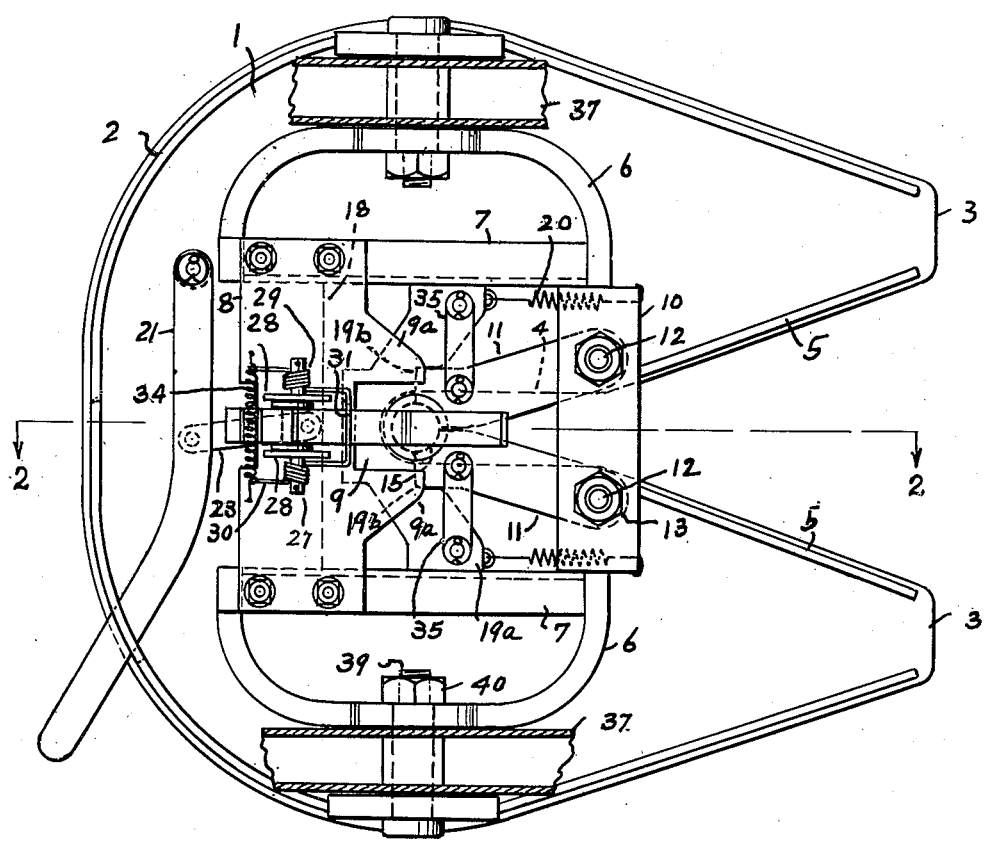
Figure 1 is a bottom plan view of the lower fifth wheel showing the king pin-engaging jaws in active or closed position.

Connected to the free ends of the arms of the jaw yoke plate there are the coil springs 20, 20 and the forward ends of these springs are connected to the overturned ends of the plate 10. These coil, pull springs 20 are provided to normally hold the jaw yoke plate in active position, that is in position to engage over the free rear ends of the jaws 11 with said ends seated in the notches 19b, and to hold said jaws in active, or king pin-engaging, position, as shown in Figure 1.

There is a handle 21 which is pivoted, at one end, to the lower fifth wheel structure and whose other end is outwardly curved and works through a slot 22 cut through the flange 2 at the rear of the lower fifth wheel. There is a link 23 which is pivotally connected, at one end, to the jaw yoke plate and, at its other end, to the handle 21. The handle is freely movable laterally along the slot 22.

The jaw yoke plate 19 is formed with a rear extension 24 and the rear end of the link 23 is pivotally connected to this extension and thereby to the yoke plate. The extension 24 is formed with a depending catch 25.

There is a control trip lever 26 which is mounted to pivot on a transverse rod 27 which is mounted to rotate in bearings in the side plates 28, 28 which embrace said lever and which depend from the cover plate 8. The forward end of the control trip lever extends underneath the rear ends of the slots 4 and 18a and said forward end is downwardly turned underneath the transverse rod 27.

There is a tension spring indicated generally by the numeral 29 which is coiled around the ends of the rod 27 and whose free ends 30 engage against the underside of the cover plate 8, as shown in Figure 1. These coils are connected by a cross bar 31 which engages underneath the control trip lever behind the rod 27 and said spring normally holds the rear end of said trip lever in its upper position.

There is a dog 32 whose front end is provided with side legs, as 33, 33, which are upwardly turned into parallel relation and have bearings through which the rod 27 passes. This dog is plate like in form, as shown in Figure 4, and its rear end is maintained in upper position by means of a tension spring 34 which is located underneath the dog and whose ends are attached to the cover plate 8, said spring 34 being under tension.

The fingers 19a, 19a of the yoke plate are connected to the corresponding jaws by means of the links 35, 35 whose ends are pivotally connected to said fingers and to said jaws, respectively, and through these links, when the jaw yoke plate, is moved to inactive, or retracted, position the said jaws will be correspondingly moved to inactive, or open, position, as shown in Figure 3, and when the jaw yoke plate is moved to active position, by the springs 20, said jaws will also be moved to active position around the king pin, as shown in Figure 1.

The numeral 36 designates the forward end of the trailer on which the lower fifth wheel is mounted and fixed to the trailer, on opposite sides, are the mounting brackets 37, 37 having aligned bearings and depending from the lower fifth wheel structure are the lugs 38, 38 which embrace the corresponding mounting brackets and which have bearings which align with the bearings of said brackets. Extended through this aligned bearings are the spindles 39, 39 having the outer end heads and whose inner ends are threaded to receive the retaining nuts 40, 40 whereby the lower fifth wheel structure is mounted to pivot on a horizontal axis.

In operation when it is desired to disconnect the draft vehicle from the trailer the handle 21 may be swung rearwardly through the slot 22 thus exerting a pull on the link 23 rearwardly. This will operate to retract the jaw yoke plate 19 placing the springs 20 under tension and swinging the jaws 11 to open position to release the king pin and uncouple the draft vehicle from the trailer, as illustrated in Figures 3 and 4, and upon rearward movement of the yoke plate the catch 25 will pass by the free upper end of the dog 32, the spring 34 yielding to permit this, and said free end will then be engaged by the spring 34, behind the catch 25, as illustrated in Figure 4, to hold the jaw yoke plate in its rear, or retracted, position so that the king pin 16 can readily pass between the jaws 11.

Thereupon the tension spring 29 will elevate forward end of the trip lever 26 and the rear end of the lever will press downwardly against dog 32 thus disengaging the dog from the catch 25 and permitting the jaws 11 to swing inwardly toward each other under the influence of the springs 20 and links 35 and the jaw yoke plate will engage about the free ends of said jaws, as illustrated in Figure 1.

When it is desired to again couple the trailer to the draft vehicle said draft vehicle will be backed by the driver so as to cause the king pin 16 to move along the slots 4, 18a and the king pin will move into the central arcuate recess in the jaw yoke plate and upon release of the lever 21 the springs 20 will pull said jaw yoke plate forwardly and the links 35 will force the jaws 11 inwardly into position to engage with said king pin with the free ends of the jaws seated in the notches 19b, 19b so as to lock the jaws in such engagement.

Should the driver of the draft vehicle not back said vehicle in such a manner as to cause the king pin to move along said slots, as normally expected, and should the king pin climb up on top of the fifth wheel plate 2, with the jaws 11 expanded as above explained, said king pin may drop through said slots onto said control trip lever, the operation of which will be the same as above explained without injuring the operating mechanism.

With the construction hereinabove described the lever 21 will not be subjected to torsional strains as is the case of the corresponding lever in the patent above referred to but will be subjected only to a straight pull and the mechanism for locking the jaws in place about the king pin and for releasing them have been found to be more positive and efficient than the similar parts disclosed by said patent.

The drawings and description are illustrative merely and it is contemplated that certain changes may be made in the mechanical construction and the dimensions and design of the operating mechanism may be varied but without departing from the principle of the invention as defined by the appended claims.

What I claim is:

1. A lower fifth wheel comprising, a supporting structure having a forwardly directed slot; jaws pivoted at their forward ends to the structure on opposite sides of the slot and whose rear ends are shaped to conform to, and to partially surround, a king pin, when the jaws are in active position; a jaw yoke plate shaped to embrace said rear ends of the jaws, on opposite sides, and to hold them in said active position; yieldable means normally holding said jaw yoke plate in said jaw-embracing position; means for moving the jaw yoke plate to inactive position to release the jaws; a trip lever pivotally mounted on the structure whose forward end is positioned to be engaged, and depressed by, the king pin; a dog pivotally mounted on the structure independently of said lever and engaged by the rear end of said lever; a catch carried by the jaw yoke plate arranged to engage said dog when said plate is moved to said inactive position to temporarily retain said plate in inactive position, and yieldable means arranged to actuate the trip lever to release the dog from said catch, upon release of the king pin from the trip lever, to allow the jaw yoke plate to return to jaw embracing position.

2. A lower fifth wheel comprising, a supporting structure having a forwardly directed slot; jaws pivoted at their forward ends to the structure on opposite sides of the slot and whose rear ends are engageable against a king pin when the jaws are in active position; a jaw yoke plate having means thereon which are directed forwardly and which are shaped to clamp the rear ends of the jaws, on opposite sides, and to hold them in active position; yieldable means normally holding said jaw yoke plate in said clamping position; means for moving the jaw yoke plate to inactive position to release the jaws; a trip lever pivotally mounted on the structure and whose forward end is positioned to be engaged and depressed by the king pin; a dog pivotally mounted on the structure independently of said lever and associated with the rear end of said lever; a catch carried by the jaw yoke plate arranged to engage said dog when said plate is moved to said inactive position to temporarily retain said plate in inactive position; means retaining the dog in said active position but yieldable to permit release of the dog and yieldable means arranged to actuate the trip lever to release the dog from said catch, upon release of the king pin from the trip lever to allow the jaw yoke plate to return to jaw clamping position.

3. A lower fifth wheel comprising, a plate having a forwardly directed king pin slot; confronting jaws pivoted at their forward ends on opposite sides of the slot and whose rear ends have complementary recesses to form a king pin bearing; a jaw yoke plate having jaw clamp means thereon; yieldable means normally holding said jaw yoke plate in position to clamp the rear ends of the jaws to hold them in active position relative to a king pin of a tractor; means for moving said jaw yoke plate to inactive, or retracted, position; a trip lever pivotally mounted on the structure whose forward end is positioned to be engaged and depressed by the king pin; interengaging means carried independently of said lever by the structure and jaw yoke plate, respectively, arranged to interengage when the jaw yoke plate is in retracted position to temporarily retain said plate in said position and means arranged to actuate the trip lever to release said interengaging means, upon release of the king pin from the trip lever, to allow the jaw yoke plate to return to jaw clamping position.

4. A lower fifth wheel comprising, a plate having a forwardly directed king pin slot; confronting jaws pivoted at their forward ends on opposite sides of the slot and whose rear ends have complementary recesses to form a king pin bearing; a jaw yoke plate having jaw clamp means thereon; yieldable means normally holding said jaw yoke plate in position to clamp the rear ends of the jaws to hold them in active position relative to a king pin of a tractor; a manually operable lever on the structure for moving said jaw yoke plate to inactive, or retracted, position; a trip lever pivotally mounted on the structure whose forward end is positioned to be engaged and depressed by the king pin; interengaging means carried independently of said lever by the structure and jaw yoke plate, respectively, arranged to interengage when the jaw yoke plate is in retracted position to temporarily retain said plate in said position and means arranged to actuate the trip lever to release said interengaging means, upon release of the king pin from the trip lever, to allow the jaw yoke plate to return to jaw clamping position.

5. A lower fifth wheel comprising, a main plate having a forwardly directed king pin slot; confronting jaws pivoted, at their forward ends, on opposite sides of the slot and whose rear ends are shaped to engage a tractor king pin; a jaw yoke plate; yieldable means normally holding said jaw yoke plate in position to cooperate with said jaws to retain the king pin in engaged position; links connecting the respective jaws with said jaw yoke plate and operative to move the jaws, with the jaw yoke plate, to active, or inactive, positions; manually operable means connected with the jaw yoke plate for moving said jaw yoke plate and jaws to inactive, or retracted, position; a trip lever pivotally mounted on the structure and positioned to be engaged by the king pin; interengaging means carried independently of said lever by the main plate and jaw yoke plate, respectively, and adapted to interengage upon movement of the jaw yoke plate to retracted position to temporarily retain said plate, and the jaws, in inactive, or retracted, position; means arranged to actuate the trip lever to release said interengaging means, upon release of the king pin from the trip lever, to allow the jaw yoke plate and the jaws to return to king pin engaging position.

WILLIAM C. NABORS.

REFERENCES CITED

The following references are of record in the file of this patent:

UNITED STATES PATENTS

| Number | Name | Date |
| --- | --- | --- |
| 2,429,483 | Nabors | Oct. 21, 1947 |